Patented June 19, 1934

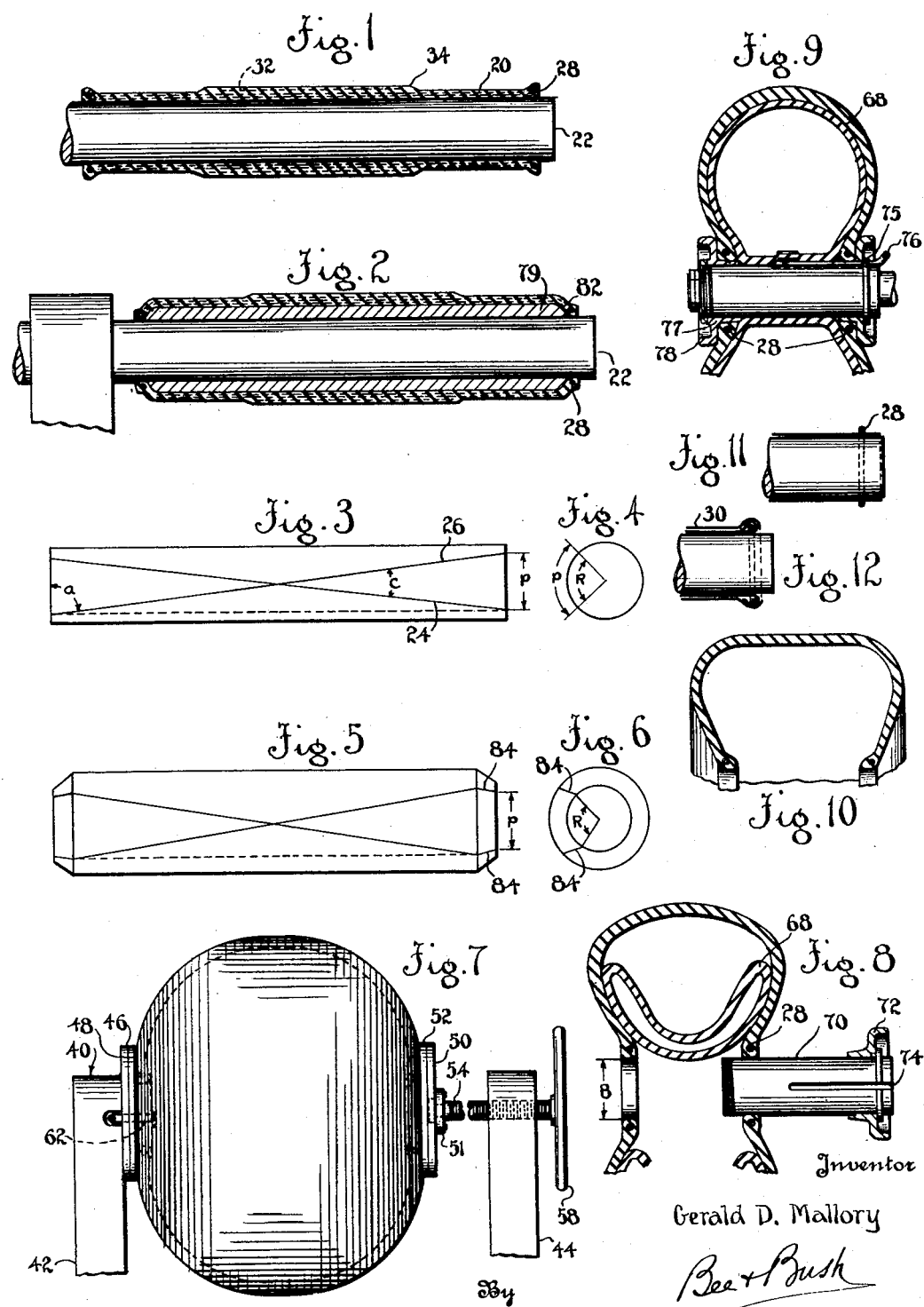

UNITED STATES PATENT OFFICE 1,963,370

METHOD OF MAKING TIRES

Gerald D. Mallory, Akron, Ohio, assignor to Wingfoot Corporation, Wilmington, Del., a corporation of Delaware Application September 15, 1930, Serial No. 481,898

1 Claim. (Cl. 154—14)

This invention relates to the manufacture of pneumatic tires and it has particular relation to the manufacture of the super-balloon type of tires that has a relatively great cross-sectional diameter and small bead diameter, and in which the beads of the tire are seated directly upon a revolving hub without the use of any intermediate wheel structure.

The object of the invention is to provide a method of manufacturing tires of the above designated type which is simple and more economical to use than the methods heretofore employed.

In the heavier-than-air craft industry, a type of tire for landing equipment has been adopted that has such small bead diameters that it can be seated directly upon a revolving hub without the use of any intermediate spokes or discs, thereby eliminating one source of weakness in aircraft wheels and also providing a tire of such relatively large cross-sectional diameter and such relatively great internal volume as to provide a wheel of maximum cushioning properties. Because of the extremely great internal volume of such tires, the sidewalls thereof may be made comparatively thin and flexible and at the same time the air pressures employed for inflation of the tires may be correspondingly reduced thereby permitting the tires to spread out or flatten out at the point of contact between the tire and the ground. As a result, the cushioning power is greatly enhanced and the area of contact is so increased that aircraft equipped with this type of tires may land or take off from ground of much softer character than is permissible where the old type of tire, having a relatively large bead diameter as compared with the overall diameter, is used. While the advantages resulting from the use of the super-balloon type tires is thus manifest, it is found by actual experience that material difficulties that are encountered only in relatively slight degree, if at all, in the manufacture of ordinary tires, are involved in the construction of tires of such small bead diameter and such large cross-sectional diameter. For example, it is difficult, if not impossible, to employ cores of cross-sectional contour corresponding to the internal contour of the finished tires because the bead openings of the tires are so small that it is impracticable, if not physically impossible, to construct a core of proper contour which can be collapsed and withdrawn through the bead openings. Furthermore, it is impracticable to construct such tires by ordinary tire built methods because the portions of the tires adjacent to the beads are of such small peripheral diameter as compared with the peripheral diameter of the tread portions of the tires that the cords of the fabric constituting the carcasses of the tires are so crowded together in the zones adjacent to the beads that it was impossible or at least impracticable to prevent excessive piling up of the various cords one upon the other while the count of cords in the tread zone would be only that which is normally required to impart satisfactory resistance to bursting of the tires. This piling-up of the cords or increase of the cord count in the bead zones of core-built tires is highly undesirable because it greatly increases the difficulty of adequately turning the plies about the beads and also because it reduces the flexibility of the side walls of the tires and tends to increase the weight of the tires, a result which is undesirable in tires employed upon aircraft.

This invention consists in the provision of a method in which tires of the super-balloon type are assembled as flat-built tubes or cylinders upon a suitable shaft or mandrel from which they may be removed and then subjected to shaping by means of a differential of fluid pressure between the internal and the external surfaces of the tires. It is, of course, admitted that ordinary vehicle tires have heretofore been constructed as cylindrical or flat built bands upon a suitable drum and then subjected to an expanding pressure (either mechanical or fluid) in order to impart the desired shape to the finished tires. However, in the ordinary tires which have heretofore been so constructed, the bead diameter is generally relatively great, usually being in excess of 16 or 18 inches for automobile and bus tires while the overall diameter of such tires of bead diameters corresponding to these values seldom exceeded 30 or 32 inches. It is manifest that the surface area of such tires, upon being subjected to the usual shaping operations, is only moderately increased. As a matter of fact, in balloon tires of the usual type, the increase in area seldom exceeded 30 or 40%. In contradistinction, in super-balloon type tires to which this invention relates, the bead diameters are extremely small as compared with the overall or peripheral diameter of the tires. The comparative values of bead diameter, overall diameter and cross-sectional diameter of certain tires which have been constructed according to this method may be tabulated as follows:

| Overall diameter in inches | Sectional diameter in inches | Bead diameter in inches | Ratio of overall to bead diameter |
|---|---|---|---|
| 20 | 9 | 4 | 5 |
| 22 | 10 | 4 | 4.5 |
| 25 | 11 | 4 | 6.25 |
| 26 | 11 | 6 | 4.3 |
| 30 | 13 | 6 | 5.0 |
| 37 | 16 | 8 | 4.6 |
| 46 | 20 | 10 | 4.6 |

It is thus apparent that in general the ratio of bead diameter to overall diameter of super-balloon type tires which are embraced in this invention in general is less than 1 to 4 and, in actual practice, is never less than 1 to 3. In contradistinction, in balloon tires of 18 inch bead diameter and 32 or even 36 inch overall diameter, the ratio of the beads to overall diameter is at least equal to 1 to 2. The latter values manifestly represent extreme cases in the conventional construction of ordinary vehicle tires in which the ratio will be much greater than the values represented above. For example, for a 19 inch bead diameter and 6 inch cross-sectional diameter, the ratio will be in the proportion of 19 to 32.

For a better understanding of the invention, reference may now be had to the accompanying drawing, forming a part of the specification, in which:

Fig. 1 is a cross-sectional view of a pneumatic airwheel type of tire under construction upon a cylindrical mandrel;

Fig. 2 is a cross-sectional view of another form of the invention;

Fig. 3 is a diagrammatical view illustrating the paths of the cords constituting the fabric of the tire carcass upon a cylindrical mandrel;

Fig. 4 is a diagrammatical end view illustrating what is termed "cord pitch" upon a cylindrical mandrel;

Fig. 5 is a diagrammatical view illustrating the paths of the cords constituting the fabric of the tire carcasses upon a crowned mandrel;

Fig. 6 is a diagrammatical end view further illustrating cord pitch in connection with the crowned mandrel;

Fig. 7 is an elevational view illustrating one step in the shaping of a tire;

Fig. 8 is a cross-sectional view illustrating a tire which has been partially shaped by the method constituting the invention in the present application;

Fig. 9 is a cross-sectional view illustrating a tire which has been completely shaped and in which an airbag and supporting hub have been inserted into position prior to vulcanization;

Fig. 10 is a cross-sectional view showing the shape assumed by tires in which the angles of the cords have been improperly adjusted; and Figs. 11 and 12 are fragmentary views illustrating steps in the assembly of a tire carcass.

In practicing the invention, a plurality of plies of fabric 20 are disposed upon a substantially cylindrical mandrel 22. The fabric constituting these plies is composed of bias cut cord fabric which preferably is of the weftless or pickless type. The fabric should be cut upon a bias in such manner that the cords extend at an angle with respect to the marginal portions thereof. The plies so cut are disposed upon the mandrel in such manner that the cords 24 of one ply extend transversely across the cords 26 of the adjacent ply at an angle which is represented at $c$ in Fig. 1. When so disposed upon the mandrel, the cords describe an angle $a$ with respect to the bead or marginal portions thereof. The relative values of the angles $a$ and $c$ are extremely important in the construction of this type of tire. If the value of $a$ is too small, it is found that the tires do not assume proper shape upon inflation. For example, instead of assuming the toroidal shape illustrated in Fig. 9, the tread portions retain a somewhat flattened condition represented in Fig. 10. Tires of the latter shape are undesirable because they are liable to burst during the process of vulcanization in a mold. Also, it is manifest that even where vulcanization of tires of this type is accomplished, the overall diameter thereof is likely to be small, thus materially reducing the clearance between the external diameters of the hubs upon which the tires are mounted on the tread zones of the tires. Also, such tires are unsymmetrical in appearance and for that reason, are not salable.

It is found by actual practice that the value of $a$ in general must be maintained in excess of 70° and for best results, it should be approximately 76° or 78°. It is possible to use greater values than the latter. However, such use is likely to result in the formation of tires which are relatively unstable in character and which permit an excessive amount of side sway of the craft which is mounted thereupon. Also, excessive cord angle is further undesirable because it is found that during the process of shaping by expansion of the tread zones that the cords constituting the portion of the carcass adjacent to the tread zone do not spread or separate uniformly. As a result, in some portions the cord count, i. e. the number of cords per unit of circumferential distance about the tire, may remain substantially the same as that in the unshaped tire band while in other zones, the count may be so reduced as to result in excessive weakening of the carcass.

It is manifest that where the cords form an angle $a$ which is other than 90° with respect to the beads, that the cord, in traversing the width of the tire band under construction, will also progress spirally about the band in such manner that the end of a cord at one bead of the band will be spaced circumferentially as well as longitudinally from the end of the other bead. The circumferential spacing represented by the projection of the cord upon a bead and termed the "pitch arc", is indicated at $p$. The angle about the central axis of the band subtended by the arc of pitch is indicated at R. It is found in actual practice that in the construction of super-balloon type tires, this angle R in general will range from 75° to 110° with an average value of approximately 100°.

The cord angles employed in the construction of this type of tire are materially different from those employed in the ordinary vehicles tires. In the latter, cord angles of 50°, or at most 55°, apparently are the maximum values which are found in actual practice. In general, the angles are materially less than these values. Fabrics in which such low values of cord angle are employed manifestly would be impractical in the construction of super-balloon tires, because the tires could not be shaped by the application of fluid pressure for purposes of expanding the tread zones thereof.

After concentric plies 20 of fabric have been disposed upon the shaft 22, beads 28 are slipped longitudinally over the ends of the drum into position upon the marginal portions of the fabric. As clearly represented in Fig. 11, the plies may then be turned upwardly about the beads after which a second set of plies 30, corresponding to the first mentioned plies, are disposed in position upon the latter and the marginal portions thereof are turned downwardly to enclose the beads as indicated in Fig. 12. Usually four plies of material are sufficient in the construction of the tires. However, if desired, additional plies may be employed. Also, in some cases, it is desirable to dispose one or more relatively narrow plies 32 in the zone corresponding to the tread of the finished tires, as shown and described in my Patent No. 1,862,492 issued June 7, 1932.

After the carcass has been thus assembled, a tread unit 34, composed of ordinary rubber material, is stitched in position thereupon thus completing the assembly of the tire. In order to shape the tires, they are removed longitudinally from the mandrel 22 and disposed in a suitable shaping machine 40 (Fig. 7). For purposes of illustration, this machine is shown as comprising a pair of spaced standards 42 and 44 to the first of which is secured a bead engaging plate 46 which preferably is covered with a pad of relatively soft pliable material 48 such as soft rubber in order to insure an adequate seal between the beads of the tires and the plate. The other bead of the tire is closed by a second plate 50 which is also covered upon the face adjacent to the bead with a pad 52 similar to the pad 48. The plate 50 is movably supported upon a screw 54 which is journaled within a suitable bearing 51 bolted or otherwise secured to the plate. The screw in turn is threadably secured within a bearing within the upright 44. The screw should also be provided with a hand wheel 58 or other convenient device for imparting rotational movement thereto.

In the shaping of a tire, the unshaped band is disposed between the plates 46 and 50 in such manner that the space within the circumference of the beads is closed by the pads 48 and 52. Fluid under compression is then admitted through a conduit 62 to the chamber thus formed within the tire in order gradually to expand the tread zone thereof. While the tire is being expanded, the wheel 58 is rotated whereby to cause the screw 54 to advance the plate 50, and thus to maintain a seal between the pads 48 and 52 and the tire beads. During this operation, the beads gradually rotate about their central axis until they assume approximately the position they occupy in the finished tires.

When the tires have been shaped approximately to the contour indicated in Fig. 8, the pressure therewithin is released and the plate 50 is retracted to permit removal of the tire. Upon removal of the tire, an airbag or inner tube 68 is inserted therein through the bead openings. A hub or shaft 70 is next passed longitudinally through the bead openings and through the inner periphery of the airbag 68. This hub is provided upon one end with a bead engaging flange 72 and is also formed with a depression or channel-like groove 74, which leads to an opening 75 in the flange 72. A valve stem 76 of the airbag 68 extends outwardly through this groove and opening. After the hub has been extended through both bead openings of the tire, a sleeve 77, having a flange 78 constituting a seat for the remaining bead of the tire, is threaded upon the projecting end of the hub 70. Fluid under compression (preferably air) may then be admitted to the airbag 68 to shape the tire into the contour indicated in Fig. 9. When this operation is complete, the tire is ready for vulcanization. This operation may conveniently be accomplished in molds of ordinary design using steam for heating purposes. Since the latter steps do not constitute a part of the applicant's invention, it is deemed unnecessary to describe them in detail.

In some cases, it may be desirable to assemble the tires upon a shaft which is slightly crowned, as indicated in Fig. 2. An adequate crown may be provided by disposing a pad 79 of flexible material or a segmental shell of rigid material having inclined ends upon the shaft 22. Where the crowned shaft is thus employed, it is necessary to make a slight correction in the cord angle of the fabric, which is employed in order to compensate for the change of the path assumed by the cords in passing over the beveled edges 82 of the crowned portions and thus to maintain a constant pitch. The portions of the cord which deviate from the main path are indicated at 84 in Figs. 5 and 6. The corrections for all ordinary degrees of crowning are comparatively slight and may readily be determined either by experimentation or by mathematical computation. Generally, it is sufficient to employ such cord angle as will impart a cord pitch corresponding to that of a tire of the same dimensions formed upon a straight mandrel.

The method constituting the subject of this invention is comparatively simple in practice because the tire carcasses may readily be assembled upon a shaft or mandrel 22 merely by wrapping the various plies of material thereabout and stitching them down in any convenient manner. Particular precautions in practicing the invention should be taken to maintain the cord angles as designated with respect to the beads in order to insure proper expansion and shaping of the tires after completion of the operation of assembling. It is found by actual experience that the values of cord angle are quite critical and comparatively small changes in angle may result in failure of the tire in the operation of shaping or vulcanizing.

Although I have illustrated only the preferred forms of the invention and have described those forms in detail, it will be apparent to those skilled in the art that the invention is not so limited but that various modifications may be made therein without departing from the spirit of the invention or from the scope of the appended claim.

What I claim is:

In a method of manufacturing pneumatic tires of the super-balloon type having a relatively large overall diameter and a relatively small bead diameter, the steps which comprise partially shaping a tire band into toroidal shape, inserting an inflatable former within the partially shaped band, subsequently placing the latter and the inflatable former upon a hub provided with means for confining the beads against outward movement, and completing the shaping operation by the application of pressure from within the inflatable former.

GERALD D. MALLORY.